United States Patent [19]
Kanda et al.

[11] Patent Number: 5,684,838
[45] Date of Patent: Nov. 4, 1997

[54] RECEIVING DEVICE FOR SAMPLING DATA BITS AT A PREFERRED TIME

[75] Inventors: Yasushi Kanda, Aichi-ken; Akihiro Sasaki, Anjo; Nobutomo Takagi; Hideaki Ishihara, both of Okazaki; Kouichi Maeda; Tengo Fujii, both of Anjo, all of Japan

[73] Assignee: Nippondenso Co., Ltd., Kariya, Japan

[21] Appl. No.: 542,303

[22] Filed: Oct. 12, 1995

[30] Foreign Application Priority Data

Oct. 12, 1994 [JP] Japan .................................. 6-246395

[51] Int. Cl.$^6$ ............................................ H04L 7/00
[52] U.S. Cl. .................... 375/342; 341/53; 375/316; 375/355
[58] Field of Search ........................ 375/342, 355, 375/360, 371, 373, 340, 354, 238, 333, 282, 316; 329/312, 313, 311; 327/141, 24, 23; 341/53, 52; 360/51, 40, 48; 364/178, 569; 369/59

[56] References Cited

U.S. PATENT DOCUMENTS

| | | | |
|---|---|---|---|
| 4,543,530 | 9/1985 | Kovach | 375/342 |
| 5,235,596 | 8/1993 | Spörer | 375/373 |
| 5,315,299 | 5/1994 | Matsumoto | 375/238 |
| 5,438,289 | 8/1995 | Kan et al. | 327/97 |
| 5,459,751 | 10/1995 | Okamoto | 375/238 |

FOREIGN PATENT DOCUMENTS

| | | |
|---|---|---|
| 61-39666 | 2/1986 | Japan . |
| 1309446 | 12/1989 | Japan . |
| 2150902 | 6/1990 | Japan . |
| 4204067 | 7/1992 | Japan . |
| 553703 | 3/1993 | Japan . |
| 553945 | 3/1993 | Japan . |

*Primary Examiner*—Stephen Chin
*Assistant Examiner*—Betsy L. Deppe
*Attorney, Agent, or Firm*—Cushman, Darby & Cushman IP Group of Pillsbury Madison & Sutro LLP

[57] ABSTRACT

In a receiving device, when a communication signal, which changes between low level and high level, is received via a filter circuit, an occurrence of an edge of the filtered received signal is monitored. Upon detection of the edge, a type of the edge, that is, whether the edge is a leading or trailing edge, is determined. Depending on the type of the edge, one of preset times prestored corresponding to types of the edges, is selected and starts to be measured. When the selected preset time elapses, the filtered received signal is sampled. With this arrangement, even when a filtering time of the filter circuit differs depending on a type of the edge of the communication signal, a constant sampling timing relative to the communication signal can be achieved irrespective of whether the detected edge is the leading or trailing edge.

14 Claims, 6 Drawing Sheets

RECEIVING DEVICE FOR SAMPLING DATA BITS AT A PREFERRED TIME

BACKGROUND OF THE INVENTION

1. Field of the Invention

The present invention relates to a receiving device for receiving a communication signal sent through a communication line, which signal changes between low level and high level depending on transmit data.

2. Description of the Prior Art

The multiplex communication system is known, wherein the serial communication of digital data is performed between a plurality of devices through a communication line.

Figure 6:
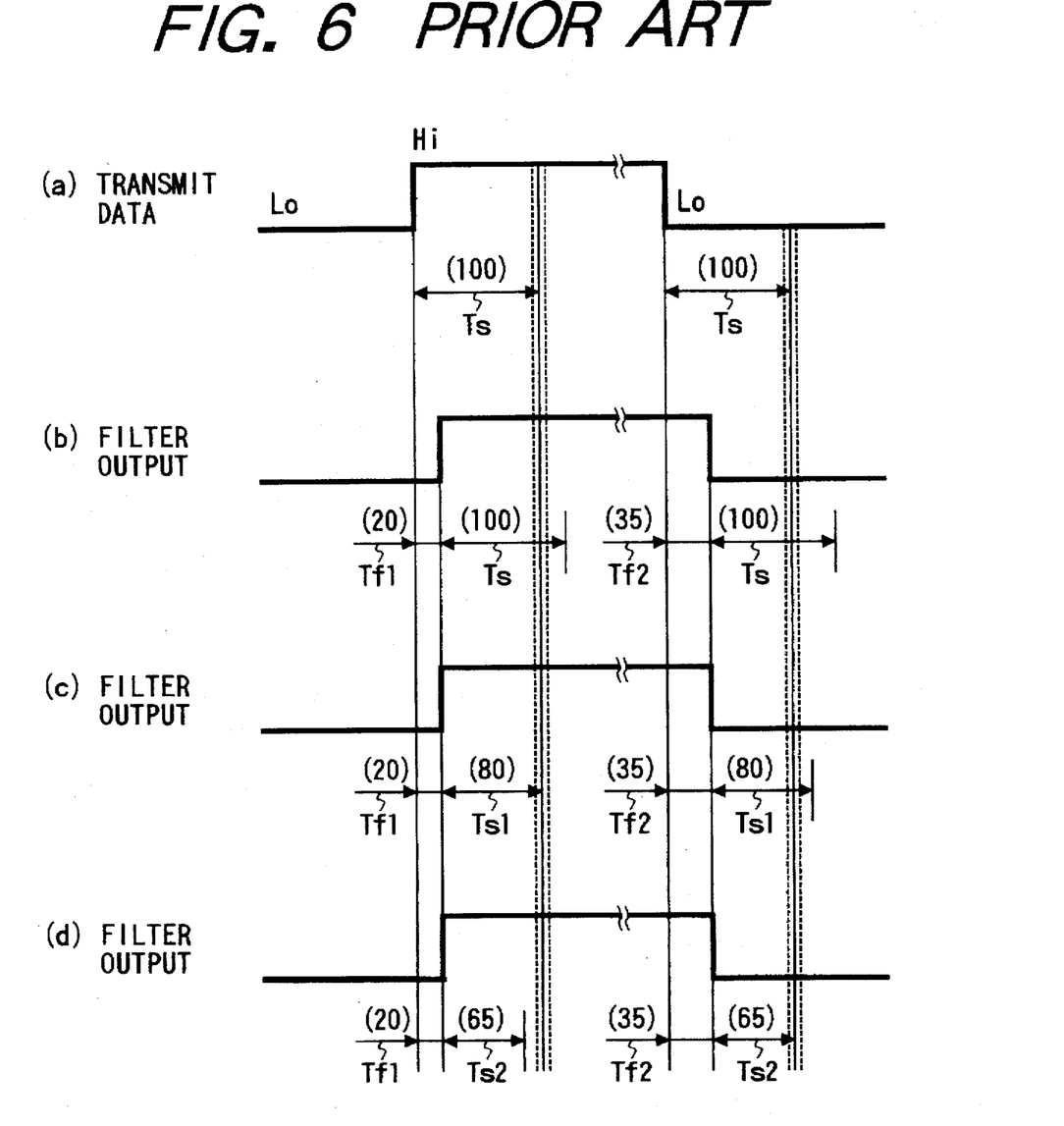
FIG. 6 is a diagram for explaining an operation of a conventional receiving device.

In the multiplex communication system of this type, two voltage levels (low level and high level) of the communication line are assigned to logic of "0" and "1" in advance, respectively. As shown in FIG. 6 at (a), a transmitter device transmits a communication signal corresponding to transmit data by changing a voltage level of the communication line from low to high or from high to low depending on each of bits of the transmit data.

On the other hand, a receiving device detects a change in voltage level of the communication line, that is, an occurrence of an edge in the communication signal, and then, as shown in FIG. 6 at (a), samples the communication signal after a given time Ts from a time point of detection of the edge. The given time Ts is shorter than one bit of the data. Thereafter, until a next edge appears in the communication signal, the receiving device samples the communication signal every time a time corresponding to one bit of the data is measured, so as to take in the transmitted data in sequence. Specifically, the receiving device is arranged to constantly sample the data at a given point relative to each bit of the communication signal, using the edge of the communication signal as a reference point.

On the other hand, a filter circuit is normally provided in the receiving device for removing noise components contained in the communication signal and waveform-shaping the communication signal into a rectangular signal. In this case, since the receiving device performs detection of the edge of the communication signal and sampling of the data based on an output signal of the filter circuit, the edge is detected with a delay, corresponding to a filtering time of the filter circuit, from the start of the actual level change of the communication signal.

If the edge is detected with a delay relative to the actual communication signal, as shown in FIG. 6 at (b), a sampling timing in the receiving device is delayed by the filtering time of the filter circuit (Tf1, Tf2 in FIG. 6) relative to a preset allowable range identified by dotted lines in FIG. 6. As a result, it is possible that the data can not be sampled precisely.

The reason for this will be explained hereinbelow.

In the multiplex communication system of this type, each of the transmitter device and the receiving device determines all time, including one bit length of the data, based on a reference clock signal (reference clock pulses) of its own. Accordingly, a deviation is caused between a time determined at the transmitter device and a time determined at the receiving device. Thus, if bits of the transmit data having the same logic continue to cause the communication signal to continue with no edge, a sampling timing relative to each bit of the transmit data gradually deviates at the receiving device.

For example, if a frequency of the clock signal in the receiving device is greater than a frequency of the clock signal in the transmitter device, a sampling timing in the receiving device relative to the transmit data gets faster. Accordingly, if the bits of the same logic continue in the transmit data, the number of bits of the received data becomes greater than the number of bits actually transmitted. To the contrary, if a frequency of the clock signal in the receiving device is smaller than a frequency of the clock signal in the transmitter device, a sampling timing in the receiving device gets slower. Accordingly, if the bits of the same logic continue in the transmit data, the number of bits of the received data becomes smaller than the number of bits actually transmitted.

In view of this, for sampling each bit precisely even if the bits of the same logic continue, the sampling timing is normally set in advance relative to the transmit data, for example, sampling each bit at a middle point thereof. However, if the sampling timing deviates from a set value range due to the filtering time of the filter circuit, a possibility of the foregoing sampling failure is increased.

Accordingly, it may be considered to set small a filtering time of the filter circuit so as to prevent a sampling timing from exceeding the preset allowable range. However, this reduces significance of providing the filter circuit. Accordingly, in the conventional receiving device, a time Ts from detection of the edge to the first sampling is set depending on the filtering time of the filter circuit so as to control the sampling timing to fall within the allowable range.

For example, as shown in FIG. 6 at (c), an allowable range of the sampling timing is set to 100 µs±5 µs. Accordingly, if a filtering time Tf1 of the filter circuit is 20 µs, a time Ts1 from detection of the edge to the first sampling is set to 80 µs.

However, particularly when the filter circuit is formed by an analog circuit, it is possible that a filtering time relative to a leading edge of the communication signal, that is, from low level to high level, largely differs from a filtering time relative to a trailing edge of the communication signal, that is, from high level to low level. In such a case, in the conventional receiving device, sampling can not be performed properly at an occurrence of either one of the edges.

For example, as shown in FIG. 6 at (c), in case a filtering time Tf1 of the filter circuit relative to the leading edge is 20 µs and a filtering time Tf2 relative to the trailing edge is 35 µs, if a time Ts1 from detection of the edge to the first sampling is set to 80 µs, a sampling timing falls within the allowable range at an occurrence of the leading edge in the communication signal. However, when the trailing edge occurs in the communication signal, a sampling timing becomes 115 µs from the actual trailing edge of the communication signal and thus does not fall within the allowable range.

To the contrary, as shown in FIG. 6 at (d), if a time Ts2 from detection of the edge to the first sampling is set to 65 µs, a sampling timing falls within the allowable range at an occurrence of the trailing edge in the communication signal. However, when the leading edge occurs in the communication signal, a sampling timing becomes 85 µs from the actual leading edge of the communication signal and thus does not fall within the allowable range.

Accordingly, in the foregoing conventional receiving device, the optimum sampling timing can not be always set so that the filtering time of the filter circuit should be set smaller to reduce the filtering capability.

The foregoing problem also occurs similarly even in a system wherein bits of the same logic are not continuously transmitted.

For example, the foregoing receiving device can also be used in the system wherein, when a transmitter side transmits a high-level signal, a receiver side drives a given object to be controlled, to the contrary, when the transmitter side transmits a low-level signal, the receiver side stops operation of the object to be controlled. As appreciated, even in such a system, if a filtering time of a filter circuit provided in the receiving device differs depending on a type of the edge, that is, the leading or trailing edge, an operation start timing and an operation stop timing of the object to be controlled differ relative to the signal from the transmitter side. Accordingly, the object to be controlled can not be controlled precisely.

SUMMARY OF THE INVENTION

Therefore, it is an object of the present invention to provide an improved receiving device.

According to one aspect of the present invention, a receiving device comprises waveform shaping means for receiving a communication signal sent through a communication line and changing between a given low level and a given high level, and for waveform-shaping the received signal for an output thereof; edge detecting means for detecting an edge of the waveform-shaped received signal outputted from the waveform shaping means; first time measuring means for measuring a preset time when the edge of the waveform-shaped received signal is detected by the edge detecting means; first sampling means for sampling the waveform-shaped received signal when the preset time elapses as measured by the first time measuring means; edge type determining means for determining whether a type of the edge of the waveform-shaped received signal detected by the edge detecting means is a leading edge changing from low level to high level or a trailing edge changing from high level to low level; storing means for storing the preset time corresponding to each of the types of the edges being the leading edge and the trailing edge; and time setting means for selecting one of the preset times stored in the storing means depending on a determination result of the edge type determining means, and for causing the first time measuring means to measure the selected preset time.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, a preferred embodiment of the present invention will be described hereinbelow with reference to the accompanying drawings. In this preferred embodiment, the present invention is applied to a multiplex communication system for a vehicle, which controls operations of power window motors and door lock motors provided in four doors at a driver's seat, a passenger seat (front seat next to the driver's seat), a rear-left seat and a rear-right seat, respectively, a wiper motor provided in a vehicle body, and the like.

Figure 1:
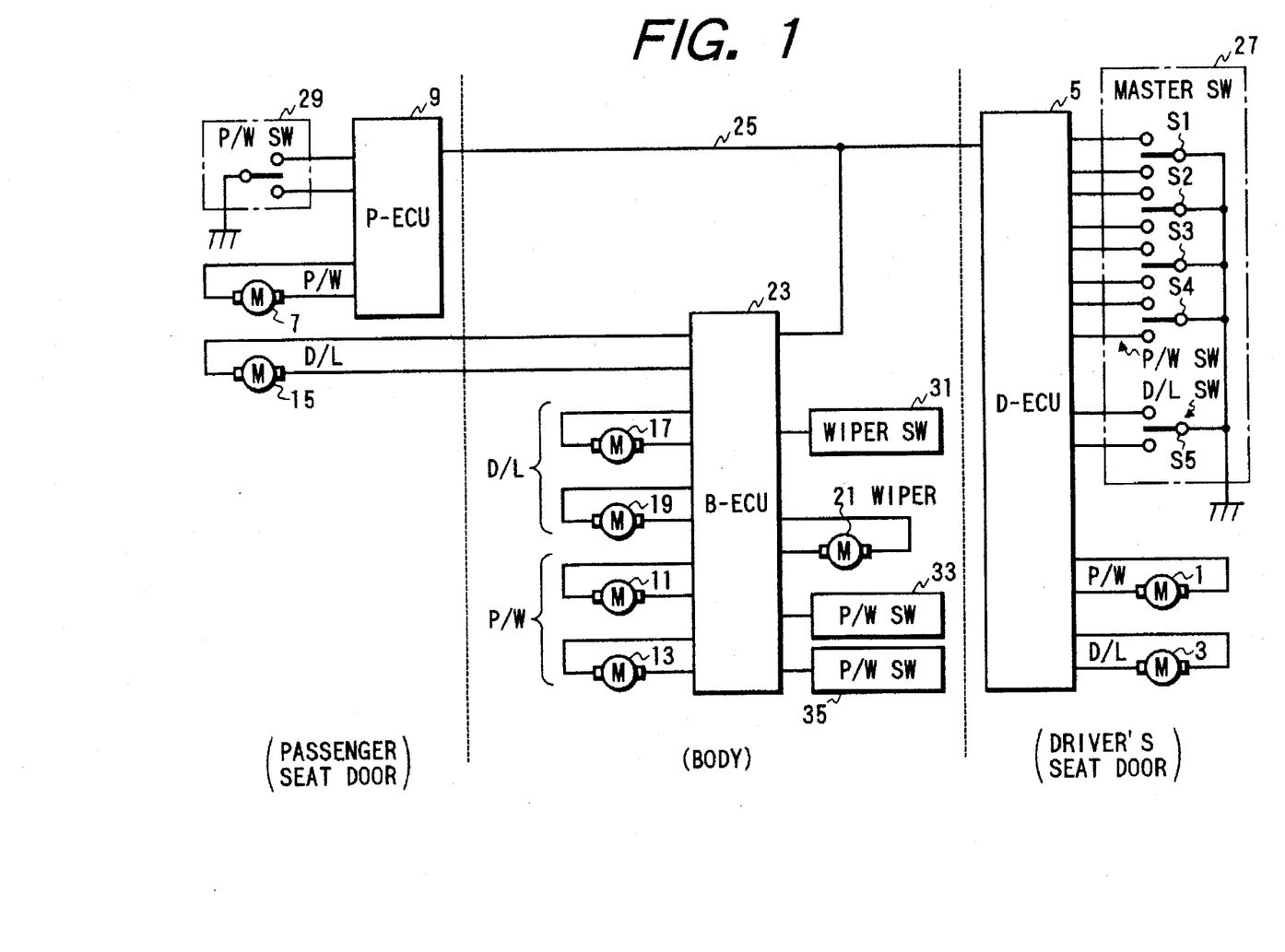
FIG. 1 is a diagram showing a structure of a multiplex communication system for a vehicle according to a preferred embodiment of the present invention.

FIG. 1 is a diagram showing a structure of a multiplex communication system for a vehicle according to a preferred embodiment of the present invention. As shown in FIG. 1, the system includes a driver's seat electronic control unit (hereinafter referred to as "D-ECU") 5 provided in a driver's seat door for controlling operations of a driver's seat power window motor (hereinafter referred to as "D-power window motor") 1 and a driver's seat door lock motor (hereinafter referred to as "D-door lock motor") 3, a passenger seat electronic control unit (hereinafter referred to as "P-ECU") 9 provided in a passenger seat door for controlling an operation of a passenger seat power window motor (hereinafter referred to as "P-power window motor") 7, and a body electronic control unit (hereinafter referred to as "B-ECU") 23 provided in a vehicle body for controlling operations of a rear-left seat power window motor (hereinafter referred to as "RL-power window motor") 11, a rear-right seat power window motor (hereinafter referred to as "RR-power window motor") 13, a passenger seat door lock motor (hereinafter referred to as "P-door lock motor") 15, a rear-left seat door lock motor (hereinafter referred to as "RL-door lock motor") 17, a rear-right seat door lock motor (hereinafter referred to as "RR-door lock motor") 19 and a wiper motor 21. The three ECU's 5, 9 and 23 are connected to each other via a communication line 25.

To the D-ECU 5 is connected a master switch 27 provided at the driver's seat door. The master switch 27 includes four power window switches S1~S4 to be operated for rotating the power window motors 1, 7, 11 and 13 in a forward or reverse direction, respectively, and one door lock switch S5 to be operated for rotating the door lock motors 3, 15, 17 and 19 in a forward or reverse direction all at once.

As shown in FIG. 1, each of the switches S1~S5 is in the form of a so-called double-throw switch having two short-circuiting terminals relative to one common terminal, and is normally set in a neutral (open) state. The common terminal is grounded, while the other two terminals are connected to the D-ECU 5, respectively. One of the terminals connected to the D-ECU 5 corresponds to forward rotation of the motor, while the other corresponds to reverse rotation of the motor.

Accordingly, the D-ECU 5 detects an operation state of each of the switches S1~S5 by monitoring voltages of contact points between the common terminal and the terminals connected to the D-ECU 5. The D-ECU 5 rotates the D-power window motor 1 in a forward or reverse direction depending on the detected operation state of the power window switch S1 so as to control a window of the driver's seat door to be opened or closed. The D-ECU 5 further rotates the D-door lock motor 3 in a forward or reverse direction depending on the detected operation state of the door lock switch S5 so as to control the driver's seat door to be locked or unlocked.

Further, the D-ECU 5 produces serial data representing the detected operation states of the power window switches S2, S3 and S4 corresponding to the P-power window motor 7, the RL-power window motor 11 and the RR-power window motor 13, respectively, and the door lock switch S5. The D-ECU 5 sends the produced serial data to the P-ECU 9 and the B-ECU 23 by changing a voltage level of the communication line 25 from low to high or from high to low corresponding to each bit of the serial data.

The serial data is formed by, for example, 8 bits and represents the detected operation states of the switches S2, S3, S4 and S5 in the order named. Specifically, the first and second bits correspond to forward and reverse rotation sides of the power window switch S2, the third and fourth bits correspond to those of the power window switch S3, the fifth and sixth bits correspond to those of the power window switch S4, and the seventh and eighth bits correspond to those of the door lock switch S5. Accordingly, for example, when only the power window switch S2 is switched to the forward rotation side, serial data "10000000" is transmitted into the communication line 25. Similarly, when only the power window switch S3 is switched to the reverse rotation side, serial data "00010000" is transmitted into the communication line 25. To the P-ECU 9 is connected a power window switch 29 having the same structure as each of the foregoing switches S1~S5 and provided at the passenger seat door. The P-ECU 9 rotates the P-power window motor 7 in a forward or reverse direction depending on the first and second bit data, corresponding to the power window switch S2, in the serial data sent from the D-ECU 5 via the communication line 25 or depending on an operation state of the power window switch 29, so as to control a window of the passenger seat door to be opened or closed.

Accordingly, the P-power window motor 7 is arranged to be driven by operating the power window switch S2 at the driver's seat door or the power window switch 29 at the passenger seat door.

To the B-ECU 23 is connected a wiper switch 31 for operating a wiper, a power window switch 33 provided at the rear-left seat door and a power window switch 35 provided at the rear-right seat door. Each of the power window switches 33 and 35 has the same structure as the power window switch 29 connected to the P-ECU 9.

The B-ECU 23 monitors operation states of the wiper switch 31 and the power window switches 33 and 35 and further receives the serial data transmitted from the D-ECU 5 via the communication line 25. Based on these data, the B-ECU 23 controls operations of the RL-power window motor 11, the RR-power window motor 13, the P-door lock motor 15, the RL-door lock motor 17, the RR-door lock motor 19 and the wiper motor 21.

Specifically, the B-ECU 23 rotates the RL-power window motor 11 in a forward or reverse direction depending on the third and fourth bit data, corresponding to the power window switch S3, in the received serial data or depending on the monitored operation state of the power window switch 33, so as to control a window of the rear-left seat door to be opened or closed. Similarly, the B-ECU 23 rotates the RR-power window motor 13 in a forward or reverse direction depending on the fifth and sixth bit data, corresponding to the power window switch S4, in the received serial data or depending on the monitored operation state of the power window switch 35, so as to control a window of the rear-right seat door to be opened or closed.

Further, the B-ECU 23 rotates the P-door lock motor 15, the RL-door lock motor 17 and the RR-door lock motor 19 in a forward or reverse direction depending on the seventh and eighth bit data, corresponding to the door lock switch S5, in the received serial data, so as to control the passenger seat door and the rear-left and rear-right seat doors to be locked or unlocked. Further, the B-ECU 23 controls an operation of the wiper motor 21 only depending on an operation state of the wiper switch 31.

Accordingly, the B-ECU 23 controls the wiper motor 21 independent of the received serial data, while controlling the P-door lock motor 15, the RL-door lock motor 17 and the RR-door lock motor 19 depending on the serial data from the D-ECU 5. On the other hand, the B-ECU 23 controls the RL- and RR-power window motors 11 and 13 depending on the monitored operation states of the power window switches 33 and 35, respectively, or depending on the serial data from the D-ECU 5. Accordingly, the RL- and RR-power window motors 11 and 13 are arranged to be driven by operating the power window switches S3 and S4 at the driver's seat door, respectively, or the power window switches 33 and 35 at the rear-left and rear-right seat doors, respectively.

In this preferred embodiment, when the power window switch S2 at the driver's seat door and the power window switch 29 at the passenger seat door are operated to the opposite sides, when the power window switch S3 at the driver's seat door and the power window switch 33 at the rear-left seat door are operated to the opposite sides, or when the power window switch S4 at the driver's seat door and the power window switch 35 at the rear-right seat door are operated to the opposite sides, the P-ECU 9 or the B-ECU 23 is arranged to stop the operation of the corresponding power window motor.

As described above, in the vehicular multiplex communication system of this preferred embodiment, it is arranged that the P-ECU 9 and the B-ECU 23 control the operations of the power window motors and the door lock motors based on the serial data (hereinafter also referred to as "transmit data") sent from the D-ECU 5.

Now, receiving sections of the P-ECU 9 and the B-ECU 23 which receive the transmit data from the D-ECU 5 will be described hereinbelow, showing an example of the B-ECU 23.

Figure 2:
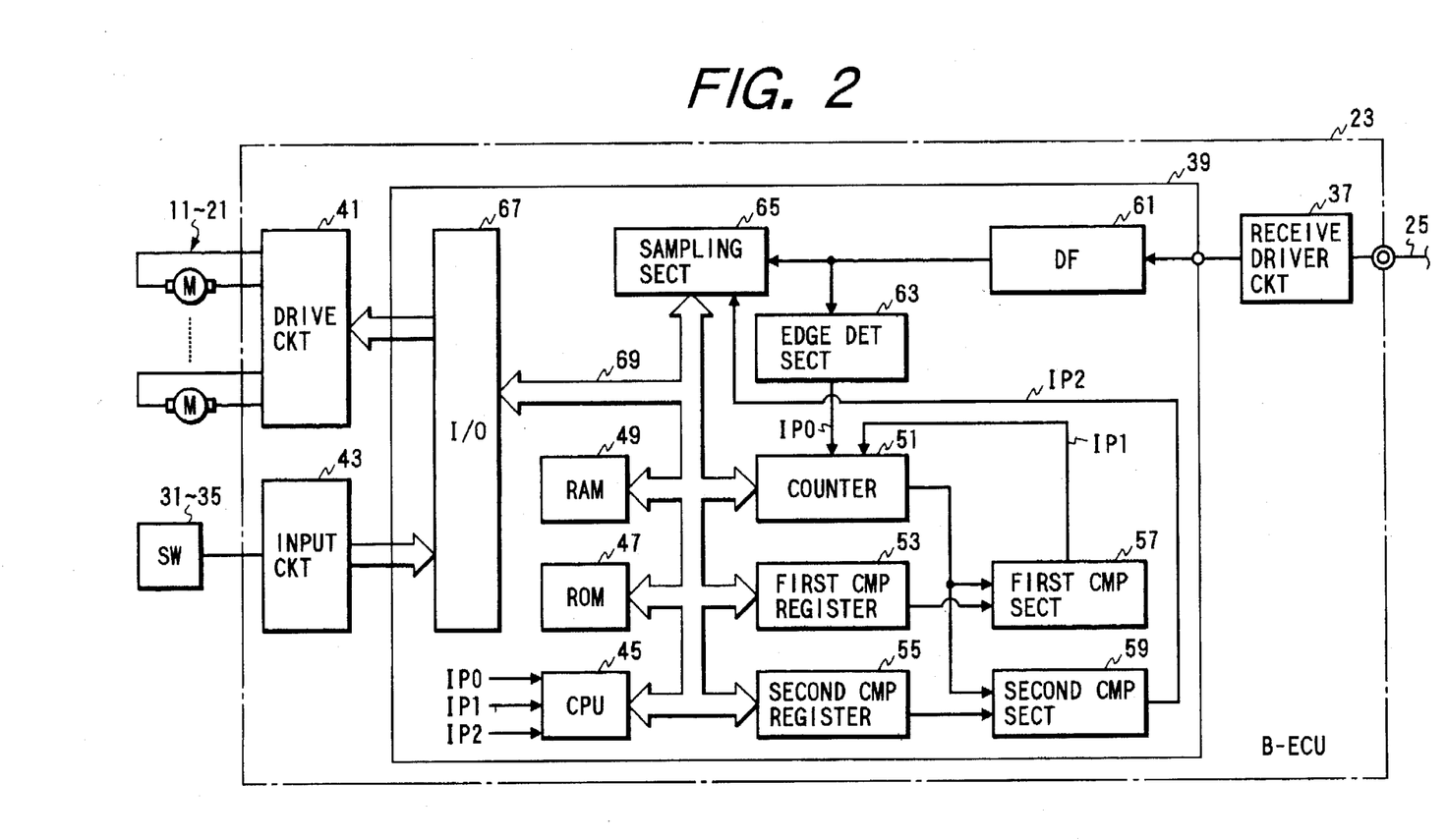
FIG. 2 is a block diagram showing an internal structure of a body electronic control unit employed in the multiplex communication system shown in FIG. 1.

FIG. 2 is a block diagram showing an internal structure of the B-ECU 23. As shown in FIG. 2, the B-ECU 23 includes a receive driver circuit 37, as waveform shaping means, for receiving the communication signal sent via the communication line 25 and waveform-shaping the received signal for an output thereof, and a microcomputer 39 which is inputted with the received signal outputted from the receive driver circuit 37 so as to execute later-described receiving processes and controls the operations of the power window motors 11 and 13, the door lock motors 15, 17 and 19 and the wiper motor 21 based on the received data. The B-ECU 23 further includes a drive circuit 41 for driving the foregoing motors 11~21 in response to a command from the microcomputer 39, and an input circuit 43 for inputting switch signals from the wiper switch 31 and the power window switches 33 and 35 provided at the rear-left and rear-right seat doors, respectively.

Figure 3:
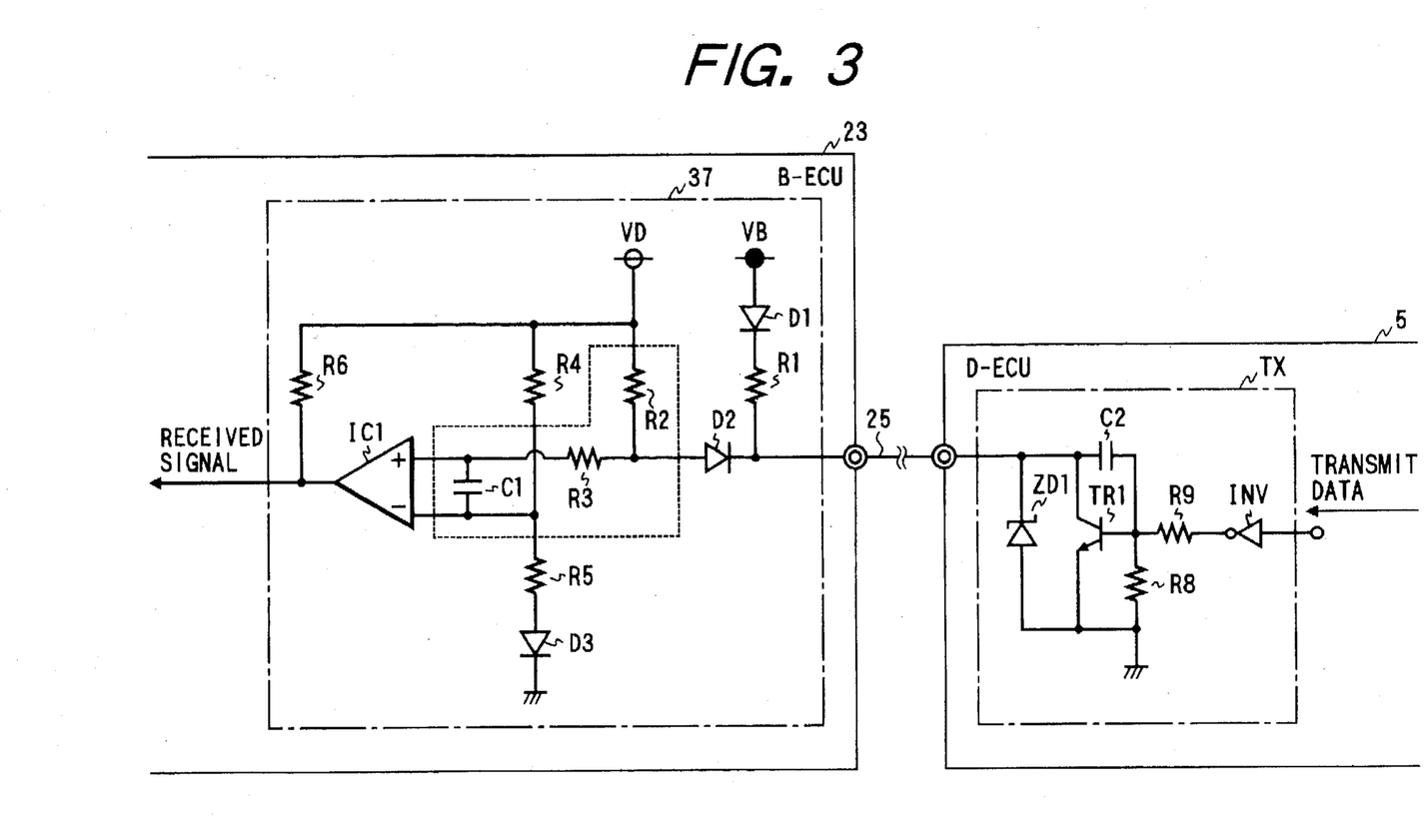
FIG. 3 is a circuit diagram showing a receive driver circuit provided in the body electronic control unit shown in FIG. 2, along with a transmit driver circuit provided in a driver's seat electronic control unit employed in the multiplex communication system shown in FIG. 1.

Hereinbelow, the receive driver circuit 37 will be described along with a transmit driver circuit TX provided in the D-ECU 5.

As shown in FIG. 3, the receive driver circuit 37 includes a diode D1 with an anode connected to a positive side of a battery, a resistor R1 connected between a cathode of the diode D1 and the communication line 25 so as to pull up a voltage level of the communication line 25 to a battery voltage (normally, 12V) VB, and a diode D2 with a cathode connected to a junction between the resistor R1 and the communication line 25. The receive driver circuit 37 further includes a resistor R2 for pulling up a voltage level at an anode of the diode D2 to a given source voltage (for example, 5V) VD which is fed to the microcomputer 39, a comparator IC1, a resistor R3 connected in series between a positive terminal of the comparator IC1 and the anode of the diode D2, and resistors R4 and R5 for dividing the foregoing source voltage VD to provide a given reference voltage and inputting this reference voltage to a negative terminal of the comparator IC1. The receive driver circuit 37 further includes a diode D3 connected in a forward direction between a side of the resistor R5 remote from the resistor R4 and a grounded point, a resistor R6 for pulling up a voltage level at an output terminal of the comparator IC1 to the foregoing source voltage VD, and a capacitor C1 connected between the positive and negative terminals of the comparator IC1.

The diode D1 is provided for protecting associated parts if the battery is connected in reverse. The diode D2 is provided for preventing the battery voltage VB from being introduced to the side of the source voltage VD. The diode D3 is provided for compensating a voltage drop across the diode D2 which varies depending on a temperature.

On the other hand, the transmit driver circuit TX provided in the D-ECU 5 includes an NPN transistor TR1 having a collector connected to the communication line 25 and an emitter grounded, a base bias resistor R8 connected between a base of the transistor TR1 and the emitter thereof, and a connected to the base of the resistor R9 connected to the base of the transistor TR1. The transmit driver circuit TX further includes a Zener diode ZD1 connected between the collector and the emitter of the transistor TR1 for protecting the transistor TR1, a capacitor C2 connected between the collector and the base of the transistor TR1 for providing a smooth switching operation of the transistor TR1 so as to reduce radiation noise from the communication line 25, and an inverter INV for inverting a logic of the transmit data which the D-ECU 5 transmits and outputting the inverted transmit data to the resistor R9.

In the transmit driver circuit TX and the receive driver circuit 37 as structured in the foregoing manner, the transistor TR1 of the transmit driver circuit TX performs a switching operation depending on the inverted transmit data. Accordingly, when the transmit data is "1", the transistor TR1 turns off so that a voltage level of the communication line 25 approximates to the battery voltage VB (high level). On the other hand, when the transmit data is "0", the transistor TR1 turns on so that a voltage level of the communication line 25 approximates to a voltage level at the grounded point (low level).

When the communication line 25 is at high level, a voltage at the positive terminal of the comparator IC1 in the receive driver circuit 37 approximates to the source voltage VD so as to be greater than the reference voltage at the negative terminal of the comparator IC1. Thus, a signal at high level is outputted from the comparator IC1 as a received signal. On the other hand, when the communication line 25 is at low level, a voltage at the positive terminal of the comparator IC1 approximates to 0.8V corresponding to a sum of voltage drops at the diode D2 and the transistor TR1) so as to be smaller than the reference voltage at the negative terminal of the comparator IC1. Thus, a signal at low level is outputted from the comparator IC1 as a received signal.

When the transistor TR1 in the transmit driver circuit TX changes from ON state to OFF state so as to change a voltage level of the communication line 25 from low to high, the capacitor C1 is charged by the source voltage VD through the resistors R2 and R3 in the receive driver circuit 37. Accordingly, the received signal from the comparator IC1 changes from low level to high level with a delay time corresponding to a charging time of the capacitor C1.

On the other hand, when the transistor TR1 changes from OFF state to ON state so as to change a voltage level of the communication line 25 from high to low, the charge held at the capacitor C1 is discharged through the resistor R3, the diode D2 and the transistor TR1. Accordingly, the received signal from the comparator IC1 changes from high level to low level with a delay time corresponding to a discharging time of the capacitor C1.

Specifically, the receive driver circuit 37 is arranged such that, even when the voltage level of the communication line 25 changes, the voltage level of the received signal is prevented from changing until the capacitor C1 is charged or discharged. This is effective for preventing the received signal from being affected by fluctuation of the voltage at the communication line 25 caused by noise or the like. Thus, in the receive driver circuit 37, a portion identified by a dotted line in FIG. 3, including the resistors R2 and R3 and the capacitor C1, performs a function of a filter.

As appreciated, in the receive driver circuit 37, a time required for a level change of the received signal when the voltage level of the communication line 25 changes from low to high, differs from a time required for a level change of the received signal when the voltage level of the communication line 25 changes from high to low. In other words, a filtering time relative to a leading edge of the communication signal and a filtering time relative to a trailing edge of the communication signal differ from each other.

The microcomputer 39 is formed by a single-chip microcomputer and operated based on a reference clock signal (reference clock pulses) generated by a clock signal generator (not shown). The microcomputer 39 includes a CPU 45 which executes various control programs in sequence based on an operation clock signal (for example, 1 MHz) derived by quartering the reference clock signal, a ROM 47 for prestoring the control programs to be executed by the CPU 45 and values to be set in later-described registers, a RAM 49 for temporarily storing results of calculation executed by the CPU 45 and the like, a counter 51 for constantly performing a counting operation in response to the foregoing operation clock signal or pulses, a first comparison register 53 in which a value to be compared with a counter value of the counter 51 is set by the CPU 45, and a second comparison register 55 in which a value to be compared with the counter value of the counter 51 is set by the CPU 45. The microcomputer 39 further includes a first comparison section 57 for comparing the counter value of the counter 51 and the value set in the first comparison register 53. When both values coincide with each other, the first comparison section 57 resets the counter 51 and outputs to the CPU 45 an interrupt request signal IP1 for requesting execution of a later-described interrupt routine which is to be executed upon detection of a border or a termination of each bit in the received signal. The microcomputer 39 further includes a second comparison section 59 for comparing the counter value of the counter 51 and the value set in the second comparison register 55. When both values coincide with each other, the second comparison section 59 outputs to the CPU 45 an interrupt request signal IP2 for requesting execution of a later-described interrupt routine which is to be executed upon determination of a sampling timing of the received signal. The microcomputer 39 further includes a majority filter 61 for sampling the received signal from the receive driver circuit 37 at every clock pulse derived by halving the reference clock signal and outputting a result of decision by majority relative to the preceding three samplings, and an edge detecting section 63 for detecting whether or not an edge occurs in the received signal from the majority filter 61. Upon detecting an occurrence of the edge, the edge detecting section 63 resets the counter 51 and outputs to the CPU 45 an interrupt request signal IP0 for requesting execution of a later-described interrupt routine which is to be executed upon detection of the edge in the received signal. The microcomputer 39 further includes a sampling section 65 for sampling and outputting the received signal from the majority filter 61 when the interrupt request signal IP2 is outputted from the second comparison section 59, I/O (input/output) ports 67 for outputting drive signals to the drive circuit 41 and inputting switch signals from the input circuit 43, and a data bus 69 for connecting the foregoing components.

Figure 4:
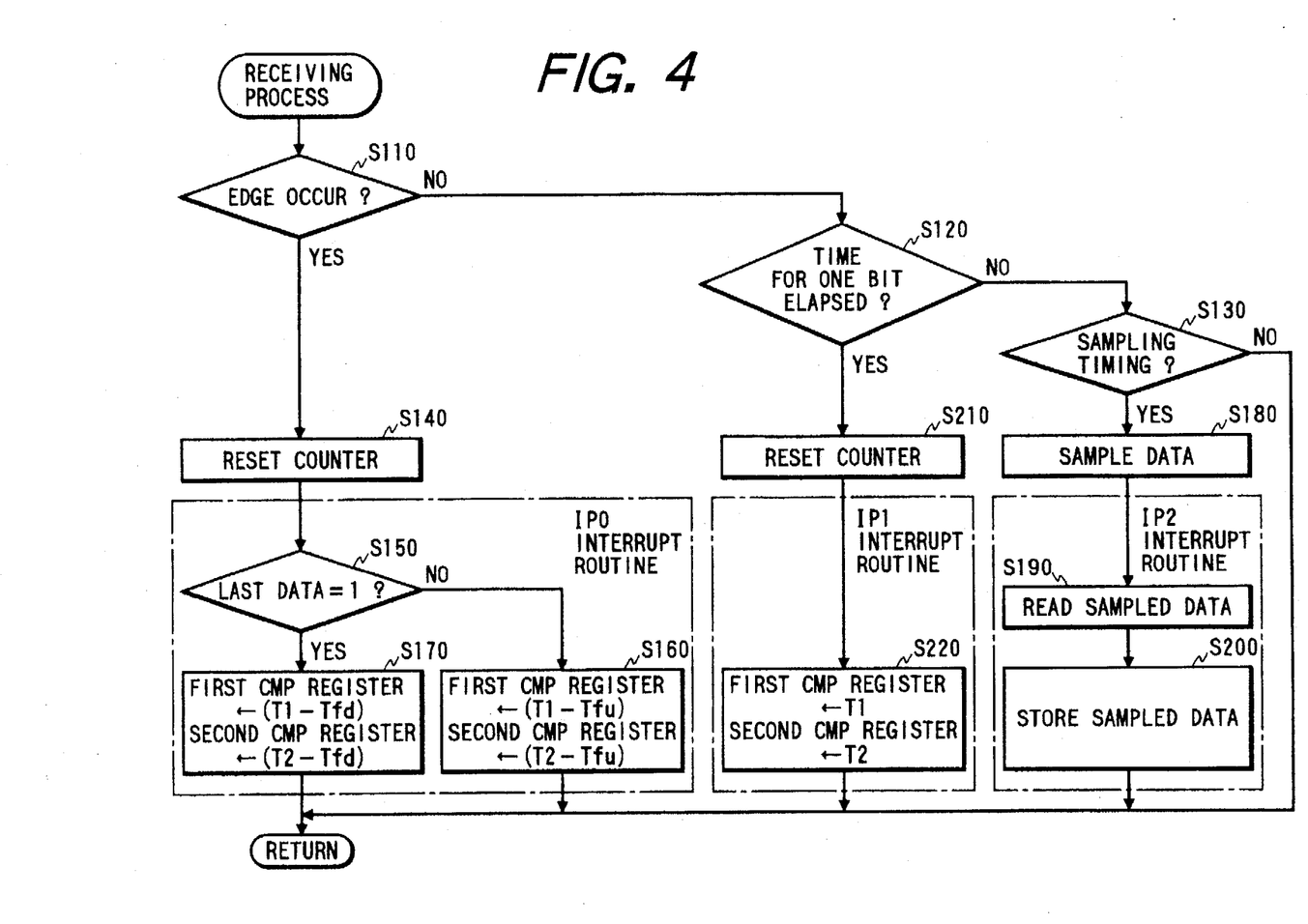
FIG. 4 is a flowchart showing receiving processes to be executed by a microcomputer provided in the body electronic control unit shown in FIG. 2.

The microcomputer 39 having the foregoing structure samples the received signal which has been waveform-shaped and outputted from the receive driver circuit 37, and takes in each of the bits of the transmit data sent from the D-ECU 5 by executing the following receiving processes:

FIG. 4 is a flowchart showing the receiving processes to be executed by the microcomputer 39 of the B-ECU 23.

The receiving processes to be executed by the microcomputer 39 are constituted by processes which are executed by the hardware including the counter 51, the first comparison register 53, the second comparison register 55, the first comparison section 57, the second comparison section 59, the edge detecting section 63 and the sampling section 65, and the foregoing three interrupt routines, shown by chain lines in FIG. 4, which are requested by the foregoing interrupt request signals IP0, IP1 and IP2, respectively, and executed by the CPU 45. In FIG. 4, the processes to be executed by the hardware and the interrupt routines to be executed by the CPU 45 are all identified by step numbers without distinction for facilitating explanation thereof.

Assuming that the interrupt request signals IP0, IP1 and IP2 are generated simultaneously, the CPU 45 executes with first priority the interrupt routine requested by the interrupt request signal IP0 from the edge detecting section 63 (hereinafter referred to as "IP0 interrupt routine" which is executed upon detection of the edge in the received signal), with second priority the interrupt routine requested by the interrupt request signal IP1 from the first comparison section 57 (hereinafter referred to as "IP1 interrupt routine" which is executed upon detection of a border or a termination of each bit in the received signal), and then the interrupt routine requested by the interrupt request signal IP2 from the second comparison section 59 (hereinafter referred to as "IP2 interrupt routine" which is executed upon detection of a sampling timing of the received signal).

In the microcomputer 39, steps S110, S120 and S130 are constantly executed in parallel.

Specifically, at step S110, the edge detecting section 63 constantly monitors the received signal fed from the receive driver circuit 37 via the majority filter 61 and determines whether the edge occurs in the received signal. At step S120, the first comparison section 57 constantly compares a constantly counted-up value of the counter 51 and the value set in the first comparison register 53. When both values coincide with each other, the first comparison section 57 determines that a time corresponding to one bit of the transmit data has elapsed. At step S130, the second comparison section 59 compares the counter value of the counter 51 and the value set in the second comparison register 55. When both values coincide with each other, the second comparison section 59 determines that a sampling timing for sampling the received signal is reached.

While steps S110, S120 and S130 all produce negative answers, the same processes continue to be executed. On the other hand, when the edge occurs in the received signal, step S110 produces positive answer. Specifically, the edge detecting section 63 detects an occurrence of the edge in the received signal and outputs the interrupt request signal IP0. Then, at step S140, the counter 51 is reset. Simultaneously, the CPU 45 executes the IP0 interrupt routine.

When the IP0 interrupt routine is started, the CPU 45 first determines at step S150 whether data sampled last is "1" (high) or not. If it is not "1", that is, "0" (low), the routine proceeds to step S160 as determining that the detected edge of the received signal is a leading edge. At step S160, a value (T1-Tfu) prestored in the ROM 47 is set in the first comparison register 53, and another value (T2-Tfu) also prestored in the ROM 47 is set in the second comparison register 55.

On the other hand, if the last sampled data is "1" at step S150, the routine proceeds to step S170 as determining that the detected edge of the received signal is a trailing edge. At step S170, a value (T1-Tfd) prestored in the ROM 47 is set in the first comparison register 53, and another value (T2-Tfd) also prestored in the ROM 47 is set in the second comparison register 55.

After executing step S160 or S170, the CPU 45 finishes the IP0 interrupt routine.

Hereinbelow, the values T1, T2, Tfu and Tfd will be explained.

Figure 5:
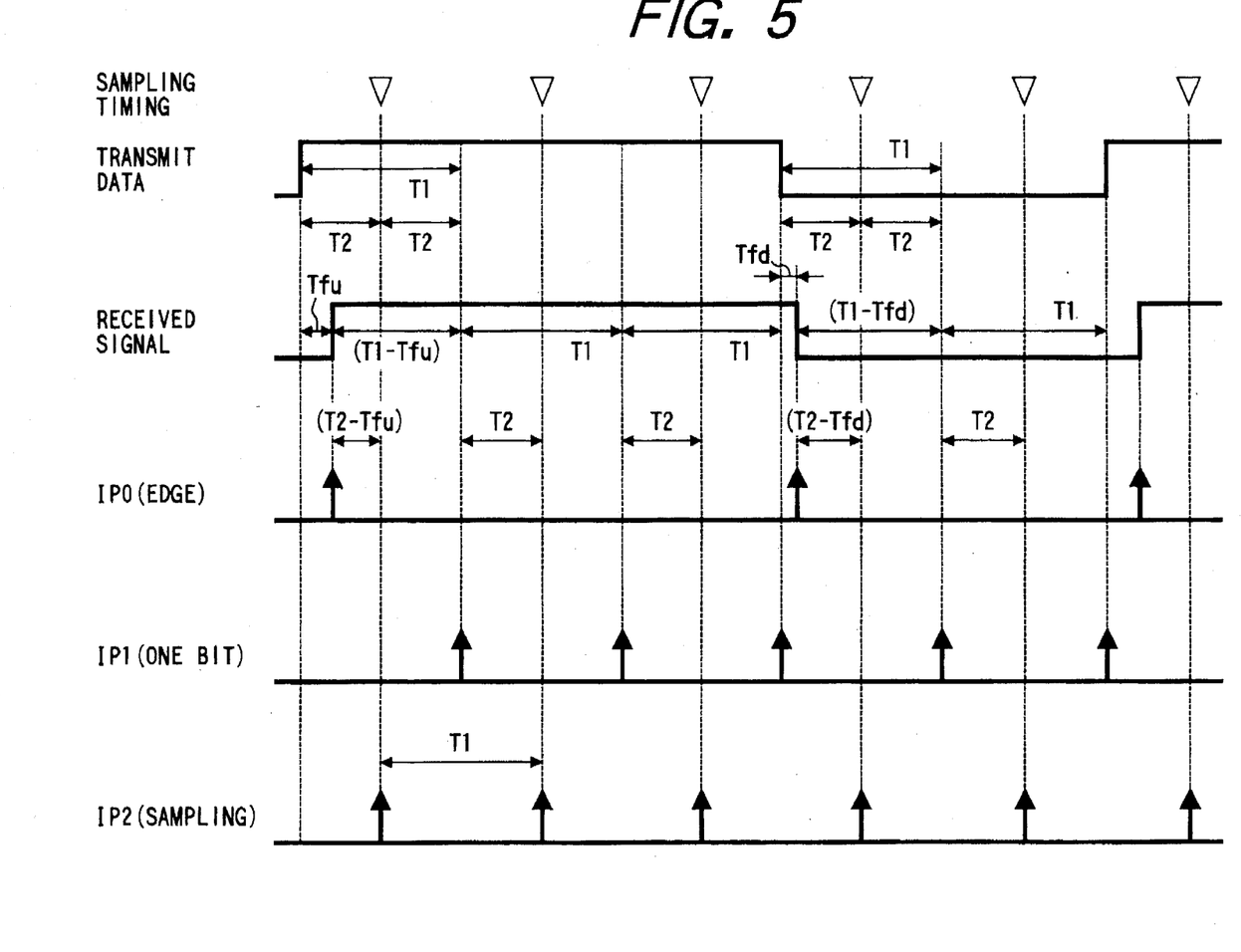
FIG. 5 is a diagram for explaining the receiving processes achieved by executing the flowchart shown in FIG. 4.

As shown in FIG. 5, T1 represents a value corresponding to one bit length of the transmit data so that a time corresponding to one bit of the transmit data elapses when the counter counts up T1. T2 represents a value corresponding to a time from a border or a start of each bit to a time point where sampling is performed. T2 is set to half of T1 in this preferred embodiment. In FIG. 5, inverted triangles represent sampling timings of the transmit data at the receiver side which are preset in the present multiplex communication system.

For example, if one bit length of the transmit data is 200 μs and an operation clock signal of the counter 51 is 1 MHz, T1 is set to 200 and T2 is set to 100.

On the other hand, Tfu represents a value corresponding to a delay time from a time point where the communication signal (the voltage level of the communication line 25) starts to change from low level to high level to a time point where the received signal from the receive driver circuit 37 shows a corresponding leading edge, that is, corresponding to a filtering time of the receive driver circuit 37 relative to a leading edge of the communication signal. Accordingly, if the counter 51 counts Tfu, the filtering time of the receive driver circuit 37 relative to the leading edge of the communication signal elapses. Similarly, Tfd represents a value corresponding to a delay time from a time point where the communication signal starts to change from high level to low level to a time point where the received signal from the receive driver circuit 37 shows a corresponding trailing edge, that is, corresponding to a filtering time of the receive driver circuit 37 relative to a trailing edge of the communication signal. Accordingly, if the counter 51 counts Tfd, the filtering time of the receive driver circuit 37 relative to the trailing edge of the communication signal elapses.

Referring back to FIG. 4, after execution of step S140 where the counter 51 is reset, the counter 51 is counted up. Thereafter, when a counter value reaches the value set in the second comparison register 55, that is, (T2-Tfu) or (T2-Tfd), step 8130 produces positive answer. Specifically, the second comparison section 59 detects agreement between the counter value of the counter 51 and the value set in the second comparison register 55 and outputs the interrupt request signal IP2.

Then, at step S180, the sampling section 65 samples the received signal. Simultaneously, the CPU 45 executes the IP2 interrupt routine.

When the IP2 interrupt routine is started, the CPU 45 first reads in the data sampled by the sampling section 65 via the data bus 69 at step S190. Subsequently, at step S200, the data read in at step S190 is stored in the RAM 4 as the last sampled data referred to at step S150 as described above and finishes the IP2 interrupt routine. As appreciated, the data stored at step 200 is used, as received data representing the transmit data, for controlling operations of the power window motors and the door lock motors.

Thereafter, when a counter value of the counter 51 reaches the value set in the first comparison register 53, that is, (T1-Tfu) or (T1-Tfd), step S120 produces positive answer. Specifically, the first comparison section 57 detects agreement between the counter value of the counter 51 and the value set in the first comparison register 53 and outputs the interrupt request signal IP1.

Subsequently, at step S210, the counter 51 is reset again. Simultaneously, the CPU 45 executes the IP1 interrupt routine.

When the IP1 interrupt routine is started, the CPU 45, at step S220, sets the value T1 prestored in the ROM 47 in the first comparison register 53 and the value T2 prestored in the ROM 47 in the second comparison register 55. After execution of step S220, the IP1 interrupt routine is finished.

Now, the processes achieved by executing the foregoing flowchart will be explained with reference to FIG. 5. FIG. 5 shows an example, wherein serial data "0111001 - - - " is sent from the D-ECU 5.

First, when the transmit data changes from "0" to "1" so that the communication signal changes from low level to high level, a leading edge appears in the received signal with a delay of a filtering time of the receive driver circuit 37 relative to a leading edge of the communication signal.

Then, the edge detecting section 63 outputs the interrupt request signal IP0, and the counter 51 is reset. Further, the value (T1-Tfu) is set (T1-Tfu) is set in the first comparison register 53 for measuring a time from occurrence of the edge in the received signal to termination of one bit. On the other hand, the value (T2-Tfu) is set in the second comparison register 55 for measuring a time from an occurrence of the edge in the received signal to a sampling timing of the received signal.

When the counter value of the counter 51 reaches (T2-Tfu), the second comparison section 59 outputs the interrupt request signal IP2, and the sampling section 65 samples the first bit after occurrence of the edge. Thereafter, when the counter value of the counter 51 reaches (T1-Tfu), the first comparison section 57 outputs the interrupt request signal IP1, and the counter 51 is reset. Then, the value T1 is set in the first comparison register 53 for measuring a time from termination of the foregoing first bit to termination of the second bit. On the other hand, the value T2 is set in the second comparison register 55 for measuring a time from termination of the foregoing first bit to a sampling timing of the second bit.

As appreciated, a time point where the counter value reaches (T2-Tfu) and sampling of the data is performed, matches the preset sampling point identified by the inverted triangle. Further, a time point where the counter value reaches (T1-Tfu) matches a time point of termination of the first bit after occurrence of the leading edge of the transmit data.

Thereafter, when the counter value reaches T2, the second comparison section 59 outputs the interrupt request signal IP2 again so that sampling of the second bit after occurrence of the edge is performed. Further, when the counter value reaches T1, the first comparison section 57 outputs the interrupt request signal IP1 again, and the counter 51 is reset. Then, the value T1 is again set in the first comparison register 53 for measuring a time point of termination of the third bit after occurrence of the edge. Similarly, the value T2 is again set in the second comparison register 55 for measuring a sampling point of the third bit.

Assuming that the level "1" of the transmit data continues, steps S180 to S200 in FIG. 4 are repeated every time the counter value reaches T2, and steps S210 and S220 in FIG. 4 are repeated every time the counter value reaches T1.

It may be arranged that, when the counter value reaches T2, the sampled data of the first bit after occurrence of the edge is used as sampled data of the second and subsequent bits until a next edge appears in the received signal.

On the other hand, when the transmit data changes from "1" to "0" so that the communication signal changes from high level to low level, a trailing edge appears in the received signal with a delay of a filtering time of the receive driver circuit 37 relative to a trailing edge of the communication signal.

Then, the edge detecting section 63 again outputs the interrupt request signal IP0, and the counter 51 is reset. Further, the value (T1-Tfd) is set in the first comparison register 53 for measuring a time from occurrence of the edge in the received signal to termination of one bit. On the other hand, the value (T2-Tfd) is set in the second comparison register 55 for measuring a time from an occurrence of the edge in the received signal to a sampling timing of the received signal.

When the counter value of the counter 51 reaches (T2-Tfd), the second comparison section 59 outputs the interrupt request signal IP2, and the sampling section 65 samples the first bit after occurrence of the edge. Thereafter, when the counter value of the counter 51 reaches (T1-Tfd), the first comparison section 57 outputs the interrupt request signal IP1, and the counter 51 is reset. Then, the value T1 is set in the first comparison register 53 for measuring a time from termination of the foregoing first bit to termination of the second bit. On the other hand, the value T2 is set in the second comparison register 55 for measuring a time from termination of the foregoing first bit to a sampling timing of the second bit.

As appreciated, as in the foregoing case, a time point where the counter value reaches (T2-Tfd) and sampling of the data is performed, matches the preset sampling point identified by the inverted triangle. Further, a time point where the counter value reaches (T1-Tfd) matches a time point of termination of the first bit after occurrence of the trailing edge in the transmit data. As further appreciated, the subsequent operations are the same as those in the foregoing case where the leading edge appears in the received signal rather than the trailing edge.

In the receiving processes performed in the B-ECU 23 according to this preferred embodiment, when the edge occurs in the received signal from the receive driver circuit 37, the counter 51 is reset and the prestored value is set in the second comparison register 55 so as to measure a time corresponding to the set value. After a lapse of the time, sampling of the first bit after occurrence of the edge is performed. Thereafter, until the next edge appears in the received signal, the received signal is sampled every time a time corresponding to one bit of the data (period of the clock signal of the counter 51×T1) elapses, so as to take in the transmit data in sequence.

In this preferred embodiment, a border or termination of each bit in the transmit data is detected by the time measuring operation achieved by the counter 51, the first comparison register 53 and the first comparison section 57, and T2 is set in the second comparison register 55 every time the border of each bit is detected. Specifically, as shown in FIG. 5, for the second and subsequent bits after occurrence of the edge, a sampling timing is set using the border of each bit as a reference point. This arrangement is effective when recognition of the border of each bit is necessary for other processes. On the other hand, if such recognition of the borders is not necessary, it may be arranged that, upon sampling the first bit after occurrence of the edge, the counter 51 is reset and T1 is set in the second comparison register 55. Thereafter, every time the counter value reaches T1 and sampling is performed by the sampling section 65, the counter 51 may be reset.

In this preferred embodiment, as the value to be set in the second comparison register 55 upon detection of the edge, the value (T2-Tfu) corresponding to the leading edge of the received signal and the value (T2-Tfd) corresponding to the trailing edge of the received signal are prestored in the ROM 47. Then, step S150 checks a type of the edge of the received signal detected by the edge detecting section 63. In case of the leading edge, step S160 sets (T2-Tfu) in the second comparison register 55, while in case of the trailing edge, step S170 sets (T2-Tfd) in the second comparison register 55. Accordingly, a time from detection of the edge in the received signal to the first sampling is set depending on the type of the edge.

Accordingly, in the B-ECU 23 of this preferred embodiment, although the receive driver circuit 37 is in the form of the analog circuit (analog filter) as shown in FIG. 3 so that a filtering time relative to the leading edge and a filtering time relative to the trailing edge differ from each other, the optimum sampling timings can be set regardless of the type of the edge, that is, whether the edge is the leading edge or the trailing edge. Specifically, the optimum sampling timings can be achieved by setting (T2-Tfu) and (T2-Tfd) such that a time from occurrence of a change from low level to high level of the communication signal to sampling of the received signal is rendered equal to a time from occurrence of a change from high level to low level of the communication signal to sampling of the received signal.

In this preferred embodiment, since the sampling timing of the first bit after detection of the edge can be set precisely irrespective of a difference in filtering time depending on the type of edge, even if the communication signal including a sequence of the same logic bits is transmitted from the D-ECU 5, sampling of the received signal is constantly achieved at a given point of each bit so that sampling failure due to disagreement of the reference clock signals at the transmitter and receiver sides can be prevented.

In this preferred embodiment, the sampling section 65 provided in the microcomputer 39 is in the form the hardware. Accordingly, in the microcomputer 39, when the counter value of the counter 51 agrees to the value in the second comparison register 55, sampling of the received signal is immediately performed so that the sampling can be achieved at a further accurate timing.

In this preferred embodiment, the values (T2-Tfu) and (T2-Tfd) are set such that a time from occurrence of the leading edge in the communication signal (voltage level of the communication line 25) to sampling of the received signal is rendered equal to a time from occurrence of the trailing edge in the communication signal to sampling of the received signal. On the other hand, the values (T2-Tfu) and (T2-Tfd) may be set further in view of the output characteristic of the transmit driver circuit TX and the delay characteristic at the communication line 25, such that a time from occurrence of a change from "0" to "1" of the transmit data itself at the D-ECU 5 to sampling of the received data at the receiver side is rendered equal to a time from occurrence of a change from "1" to "0" of the transmit data itself at the D-ECU 5 to sampling of the received data at the receiver side.

In this case, depending not only the filter characteristic at the receive driver circuit 37 but also the propagation delay characteristic of all the communication system, the optimum sampling timing can be set.

Further, in the foregoing preferred embodiment, B-ECU 23 only receives the data through the communication line 25. However, the structure of this preferred embodiment can also be applied to a device which is also provided with a transmit driver circuit for sending data into the communication line 25 so as to perform the two-way communication.

In the foregoing preferred embodiment, the serial data communication is performed between a plurality of the devices. On the other hand, the structure including the receive driver circuit 37 and the microcomputer 39 as the main components can also be used in the system wherein, when the transmitter side transmits a high-level signal, the receiver side drives a given object to be controlled, to the contrary, when the transmitter side transmits a low-level signal, the receiver side stops operation of the object to be controlled. In this case, even if a filtering time of the receive driver circuit differs depending on a type of the edge, an operation start timing and an operation stop timing of the object to be controlled at the receiver side coincide with each other relative to the signal from the transmitter side. Accordingly, the object to be controlled can be controlled precisely.

While the present invention has been described in terms of the preferred embodiment, the invention is not to be limited thereto, but can be embodied in various ways without departing from the principle of the invention as defined in the appended claims.

What is claimed is:

1. A receiving device comprising:
    waveform shaping means for receiving a communication signal sent through a communication line and changing between a given low level and a given high level, and for waveform-shaping the received signal for an output thereof;
    edge detecting means for detecting an edge of the waveform-shaped received signal outputted from said waveform shaping means;
    first time measuring means for measuring a preset time when the edge of said waveform-shaped received signal is detected by said edge detecting means;
    first sampling means for sampling said waveform-shaped received signal when said preset time elapses as measured by said first time measuring means;

edge type determining means for determining whether a type of the edge of the waveform-shaped received signal detected by said edge detecting means is a leading edge changing from low level to high level or a trailing edge changing from high level to low level;

storing means for storing said preset time corresponding to each of the types of the edges being said leading edge and said trailing edge; and time setting means for selecting one of said preset times stored in said storing means depending on a determination result of said edge type determining means, and for causing said first time measuring means to measure the selected preset time.

2. The receiving device according to claim 1, wherein second sampling means is provided for sampling said waveform-shaped received signal every time said preset time corresponding to one bit of said communication signal elapses, after said first sampling means samples said waveform-shaped received signal and until said edge detecting means detects a next edge of said waveform-shaped received signal.

3. The receiving device according to claim 2, wherein second time measuring means is provided for measuring said preset time corresponding to one bit of the communication signal and for causing said second sampling means to sample said waveform-shaped received signal every time said preset time corresponding to one bit of the communication signal elapses, wherein at least said first and second time measuring means, said first and second sampling means, said storing means and said time setting means are in the form of a single-chip microcomputer, and wherein said first and second sampling means are in the form of hardware in the single-chip microcomputer.

4. The receiving device according to claim 1, wherein said waveform shaping means comprises an analog filter.

5. The receiving device according to claim 1, wherein said communication signal is in the form of serial data including a plurality of bits representing operation states of a plurality of switches.

6. The receiving device according to claim 1, wherein said communication signal is in the form of serial data for controlling operations of a plurality of driving means.

7. The receiving device according to claim 1, wherein said waveform shaping means comprises a filter circuit including a resistor and a capacitor.

8. The receiving device according to claim 1, wherein a transmit driver circuit is connected to said communication line for sending said communication signal to said waveform shaping means.

9. The receiving device according to claim 1, wherein, said waveform shaping means comprises a receive driver circuit connected to said communication line for receiving said communication signal.

10. The receiving device according to claim 8, wherein said transmit driver circuit includes switching means having a terminal connected to said communication line and a grounded terminal, wherein said switching means turns on to connect said communication line and said grounded terminal in response to a low level of a data signal to be sent to said waveform shaping means as said communication signal via the communication line, and wherein said switching means turns off to disconnect said communication line and said grounded terminal in response to a high level of said data signal.

11. The receiving device according to claim 9, wherein said receive driver circuit includes a filter circuit for receiving and filtering said communication signal sent through the communication line, said filter circuit providing a first filtering time relative to a change in level of said communication signal from low to high and a second filtering time relative to a change in level of said communication signal from high to low, said first filtering time differing from said second filtering time, and wherein said receive driver circuit further includes a comparator applied with a reference voltage and connected to said filter circuit, said comparator providing one of high-level and low-level outputs depending on an output of said filter circuit so as to produce said waveform-shaped received signal.

12. The receiving device according to claim 11, wherein said preset times are determined based on said first and second filtering times.

13. The receiving device according to claim 1, wherein said preset times are determined based on a propagation delay characteristic of a communication system.

14. The receiving device according to claim 1, wherein said waveform-shaped received signal sampled by said first sampling means is used for controlling an operation of a given object such that the given object is driven when said sampled received signal is high in level, while stopped when said sampled received signal is low in level.

* * * * *